(12) United States Patent
Berger et al.

(10) Patent No.: US 11,185,005 B2
(45) Date of Patent: Nov. 30, 2021

(54) DRIVER ASSISTANCE SYSTEM FOR CONTROLLING A COMBINATION OF AGRICULTURAL VEHICLES

(71) Applicant: CLAAS Selbstfahrende Erntemaschinen GmbH, Harsewinkel (DE)

(72) Inventors: Arthur Berger, Bissendorf (DE); Sascha Dieckmeyer, Melle (DE); Lennart Meyer, Aachen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 246 days.

(21) Appl. No.: 16/171,579

(22) Filed: Oct. 26, 2018

(65) Prior Publication Data

US 2019/0183031 A1    Jun. 20, 2019

(30) Foreign Application Priority Data

Dec. 15, 2017    (DE) .......................... 102017130146.1

(51) Int. Cl.
*A01B 71/02*    (2006.01)
*A01B 59/04*    (2006.01)
(Continued)

(52) U.S. Cl.
CPC .............. *A01B 71/02* (2013.01); *A01B 59/04* (2013.01); *A01B 59/00* (2013.01); *A01D 41/141* (2013.01); *B62D 49/0692* (2013.01)

(58) Field of Classification Search
CPC .... A01D 41/127; A01D 34/006; A01D 34/54; A01B 59/04; A01B 71/02;
(Continued)

(56) References Cited

U.S. PATENT DOCUMENTS 4,749,238 A  *  6/1988  Singleton .............. B60T 13/662
                                                      303/15
5,179,634 A  *  1/1993  Matsunaga ............ G06N 5/048
                                                       706/59
(Continued)

FOREIGN PATENT DOCUMENTS

DE        4239530 A1    5/1994
DE    102011006052 A1   11/2011
(Continued)

OTHER PUBLICATIONS

European Search Report dated Apr. 24, 2019 with English translation of relevant parts (issued in corresponding EP Application Serial No. 18 19 50 56).

*Primary Examiner* — Redhwan K Mawari
(74) *Attorney, Agent, or Firm* — Collard & Roe, P.C.

(57) ABSTRACT

A driver assistance system for controlling a combination of agricultural vehicles including a towing vehicle designed as a tractor and a mounted device, wherein the driver assistance system generates control parameters for the towing vehicle and/or for the mounted device. The driver assistance system has an input/output unit for the dialog with the user. The driver assistance system is formed by a rule interpreter which generates the control parameters by executing the rules of a set of rules, and the driver assistance system has a linking module which receives at least two sets of rules from different data sources and generates, on the basis of the received sets of rules and according to a linkage specification, the set of rules to be executed by the rule interpreter.

5 Claims, 1 Drawing Sheet

(51) Int. Cl.
*A01B 59/00* (2006.01)
*A01D 41/14* (2006.01)
*B62D 49/06* (2006.01)

(58) Field of Classification Search
CPC ........... B60W 2300/158; G05B 13/024; G07C 5/0825; Y10S 56/15
See application file for complete search history.

(56) References Cited

U.S. PATENT DOCUMENTS

| | | | |
|---|---|---|---|
| 9,026,321 B2* | 5/2015 | Henry | A01B 63/28 |
| | | | 701/50 |
| 9,119,348 B2 | 9/2015 | Martin et al. | |
| 10,085,372 B2* | 10/2018 | Noyer | B60W 50/085 |
| 2005/0033454 A1* | 2/2005 | Fitzner | A01D 41/127 |
| | | | 700/11 |
| 2012/0004812 A1* | 1/2012 | Baumgarten | A01D 41/127 |
| | | | 701/50 |
| 2013/0297166 A1* | 11/2013 | Thomas | B60T 13/08 |
| | | | 701/70 |
| 2017/0124463 A1* | 5/2017 | Chen | A01D 91/04 |
| 2017/0325394 A1 | 11/2017 | Clement et al. | |
| 2018/0208058 A1* | 7/2018 | Czapka | A01C 21/00 |
| 2019/0183031 A1* | 6/2019 | Berger | A01B 71/02 |

FOREIGN PATENT DOCUMENTS

| | | |
|---|---|---|
| DE | 102012109210 A1 | 4/2014 |
| DE | 102014206233 A1 | 11/2015 |
| DE | 102016118205 A1 | 11/2017 |

* cited by examiner

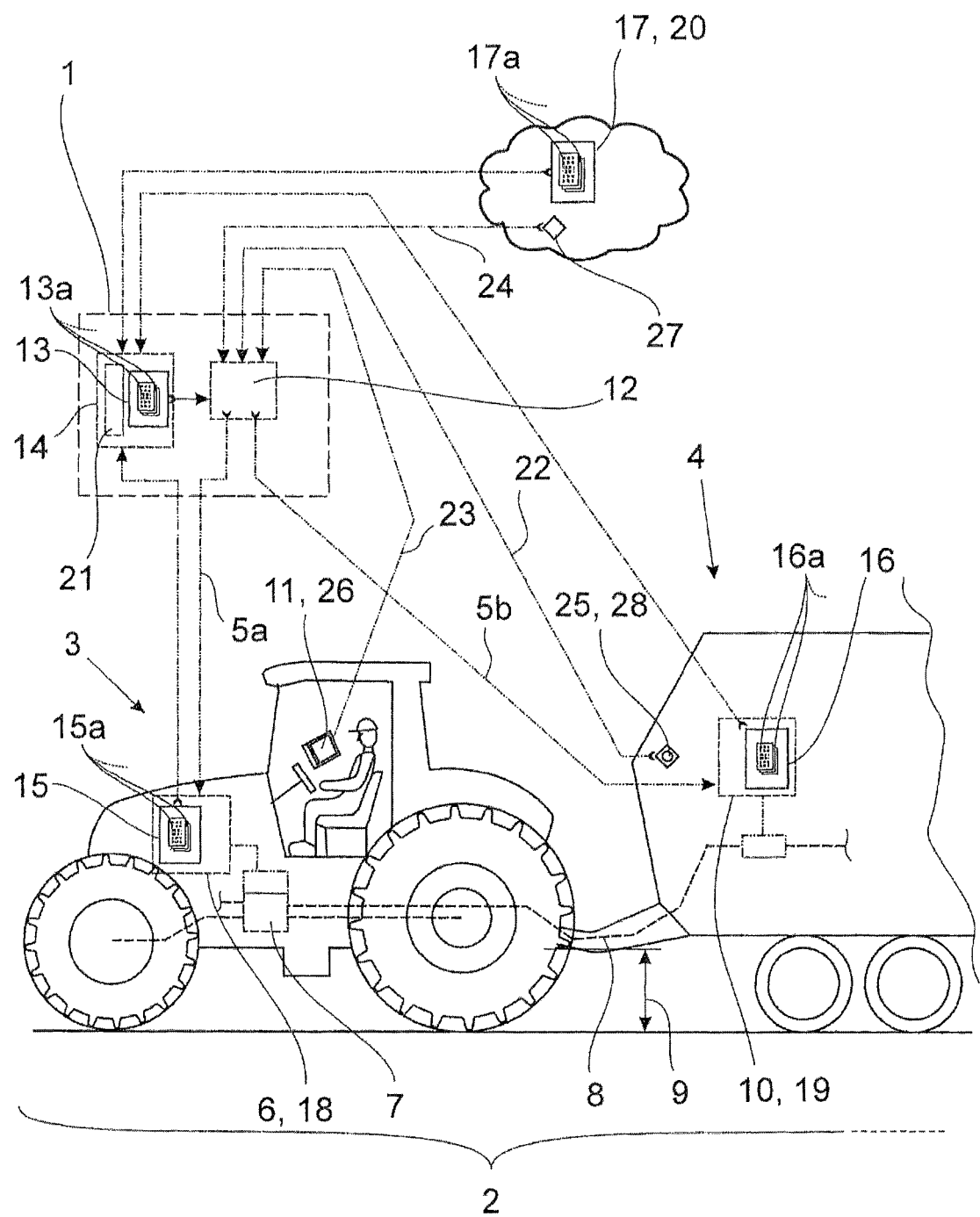

DRIVER ASSISTANCE SYSTEM FOR CONTROLLING A COMBINATION OF AGRICULTURAL VEHICLES

CROSS-REFERENCE TO RELATED APPLICATIONS

This application claims priority under 35 USC 119 of German Patent Application No. DE 10 2017130146.1, filed on Dec. 15, 2017, the disclosure of which is herein incorporated by reference.

BACKGROUND OF THE INVENTION

1. Field of the Invention

The invention relates to a driver assistance system for controlling a combination of agricultural vehicles and to a combination of agricultural vehicles comprising such a driver assistance system.

2. The Prior Art

The combination of agricultural vehicles at issue is equipped with a towing vehicle designed as a tractor and with a mounted device which is coupled to the towing vehicle. In this case, one and the same tractor can be combined with the most highly diverse mounted devices. Such mounted devices are, for example, cutting mechanisms, balers, windrowers, turnover mechanisms, soil management devices, fertilizer spreaders, or the like.

For an optimal control of the combination of vehicles under certain optimization criteria, it is known to assign a driver assistance system to the towing vehicle (DE 10 2012 109 210 A1). In the case of the known driver assistance system, it has become known that the knowledge of certain properties of the towing vehicle, on the one hand, and of the mounted device, on the other hand, is essential for an optimized control of the combination of vehicles. For this purpose, DE 10 2012 109 210 A1 describes an approach for identifying the mounted device, on the basis of which the control of the combination of vehicles as a whole is carried out.

By way of the known driver assistance system, a first step has been made in the direction of an optimally coordinated control of the towing vehicle and the mounted device. The coordinated control in the case of the known driver assistance system relies on the use of fixedly stored parameter sets, however. The flexibility of the driver assistance system with respect to the combination of the tractor with modified or entirely new mounted devices is therefore limited in terms of control.

SUMMARY OF THE INVENTION

The problem addressed by the invention is that of designing and refining the known driver assistance system in such a way that the flexibility with respect to the composition of the combination of vehicles comprising a towing vehicle and a mounted device is increased while also optimizing the control of the combination of vehicles.

The aforementioned problem is solved in the case of a driver assistance system for controlling a combination of agricultural vehicles, comprising a towing vehicle designed as a tractor and comprising a mounted device, wherein the driver assistance system generates control parameters for the towing vehicle, in particular for a machine controller of the towing vehicle, and/or for the mounted device, in particular for a device controller of the mounted device. The driver assistance system comprises an input/output unit for the dialog with the user, and a rule interpreter which generates the control parameters by executing the rules of a set of rules. The driver assistance system also comprises a linking module which receives at least two sets of rules from different data sources and generates, on the basis of the received sets of rules and according to a linkage specification, the set of rules to be executed by the rule interpreter.

First of all, it is assumed that the driver assistance system generates control parameters for the towing vehicle and/or for the mounted device, wherein the driver assistance system comprises an input/output unit for the dialog with the operator. "Dialog" is to be understood to mean, more generally, that the input/output unit is suited, on the one hand, for the input of information by the user and for the output of information to the user.

The generated control parameters are preferably delivered to the machine controller of the towing vehicle and/or to the device controller of the mounted device, if present. A change in the control parameters then brings about a corresponding change in the machine settings and/or device settings. The change in the control parameters can take place fully automatically or via an operator input. In the latter case, the operator can be prompted, for example, via the input/output unit, to make appropriate entries.

According to the invention, it has now been recognized that the structural configuration of the driver assistance system as a rules-based control opens up new possibilities with respect to the aforementioned flexibility. Such a rules-based control system is known, in principle. The rules-based control system comprises a generic rule interpreter which is configured for executing the rules of a set of rules. In this case, the rules are preferably based on simple "if-then conditions". In order to execute the set of rules, input parameters are fed to the rule interpreter, to which the rule interpreter applies the rules of the set of rules. This yields output parameters which result from the input parameters, on the one hand, and from the set of rules, on the other hand. The rules of the set of rules have a standardized format, and so entirely unknown rules can be executed by the rule interpreter in a reproducible way.

The driver assistance system according to the invention is equipped with an aforementioned rule interpreter which generates the control parameters for the combination of vehicles by executing the rules of a set of rules. In this case, the rule interpreter is a generic unit which is designed independently of the design of the towing vehicle and the mounted device. The set of rules, however, represents the towing vehicle-specific and/or mounted device-specific properties, as will be explained further below.

According to the invention, it has now been recognized that the embodiment of the driver assistance system as a rules-based control allows for a systematic flexibilization of the combination of vehicles with respect to control. Specifically, it is provided that the driver assistance system comprises a linking module which receives at least two— different—sets of rules from different data sources and generates, on the basis of the received sets of rules and according to a linkage specification, the set of rules to be executed by the rule interpreter. This is possible, since the rules of the sets of rules are present in a standardized form in a rules-based control, and so a linkage of the rules is readily possible in an automated way, for example, based on known logical operators. A different prioritization of the rules from different data sources is also conceivable, as will be explained further below.

The term "different data source" is to be understood, more generally in this case, to mean that the data sources are made available by respective different data processing hardware systems.

In practical application, the approach according to the invention can be implemented in such a way that a first set of rules is assigned to the towing vehicle, which includes all rules for an optimized control of the towing vehicle under various optimization criteria, while a further set of rules is assigned to the mounted device, which includes appropriate rules for an optimized operation of the mounted device. The rules of the mounted device can relate to the control of the mounted device itself, but also to the control of the towing vehicle, in particular with respect to a rotational speed or a torque of the power take-off shaft of the towing vehicle. A set of rules which includes rules for various mounted devices can have already been assigned to the towing vehicle as delivered. Such rules affecting the mounted devices are kept rather generic in this case.

According to the invention, the two sets of rules are linked to one another according to the linkage specification in such a way that a resultant set of rules is obtained, which is to be executed by the rule interpreter. The linkage can take place, for example, in such a way that the rules of the two sets of rules are combined, in unchanged form, into one resultant set of rules, provided that doing so does not adversely affect the functions of the towing vehicle and the mounted device necessary for operation. This would be the case, for example, when the execution of a mounted device-specific rule would result in the incorporation of an operating point which cannot be physically implemented by the towing vehicle. In such a case, rules from two sets of rules are present, which compete with each other and which can be taken into consideration by the linkage specification in a different way which is explained further below.

By way of the approach according to the invention, an optimized control of the combination of vehicles becomes possible, wherein the combination of vehicles can be based on a combination of highly diverse towing vehicles with highly diverse mounted devices. With respect to control, the approach according to the invention ensures that there are no limitations whatsoever on the aforementioned flexibility.

In one embodiment, the at least two sets of rules are a set of rules specific to a combination of vehicles, and a mounted device-specific set of rules, which are appropriately linked to one another. In principle, it can also be provided that a set of rules specific to a combination of vehicles is received from a data source, which includes rules for an optimized control of the combination of vehicles as a whole.

Other embodiments relate to advantageous data sources for a towing vehicle-specific set of rules, a mounted device-specific set of rules, and a set of rules specific to a combination of vehicles. It can be advantageous for the towing vehicle-specific set of rules and the mounted device-specific set of rules to each be locally stored, in particular, in the machine controller or in the device controller. These are easily implemented variants which can be operated in the stand-alone mode without a communication link to an external point.

Alternatively, it can be provided that a towing vehicle-specific set of rules or a mounted device-specific set of rules are received from a data source remote from the combination of vehicles. For example, the relevant set of rules can be stored in a cloud-based data processing system. This allows for the worldwide exchange of relevant sets of rules. A continuous optimization of a set of rules based on the practical experience obtained, for example, is therefore possible without the need for the user to do anything for this purpose.

Another embodiment describes a particularly preferred mixed form, in which the towing vehicle-specific set of rules is received from the machine controller and the mounted device-specific set of rules is received from a data source remote from the combination of vehicles. This is appropriate, in that changing the mounted device is more common in practical application than changing the towing vehicle.

As mentioned above, the rule interpreter applies the rules of the set of rules, which are to be executed, to input parameters. According thereto, the input parameters can also originate from different data sources, for example, from a sensor system of the towing vehicle and/or from the mounted device, from the input/output unit of the driver assistance system, or from a data source remote from the combination of vehicles.

In the particularly preferred embodiment, the input parameters are optimization criteria which have been pre-defined by the user and which are preferably entered by the user via the input/output unit.

The approach according to the invention also allows for a particularly flexible implementation of the rule interpreter, of the linking module, and of the input/output unit. These components can be implemented so as to be fixed to the towing vehicle, fixed to the mounted device, or remote from the combination of vehicles. It is even conceivable that at least one of these components runs on a cloud-based data processing system. This flexibility results, in particular, due to the fact that the standardized rules of the sets of rules allow for an unproblematic structural separation from the rule interpreter, on the one hand, and from the linking module, on the other hand.

Other embodiments relate to easily implemented variants of the linkage specification. The simplest variant is the aggregation of the rules of the received sets of rules with one another in unchanged form.

According to one further teaching, which has independent significance, a combination of agricultural vehicles comprising a towing vehicle and a mounted device is claimed. An essential aspect of this further teaching is the equipment of the combination of vehicles with a driver assistance system according to the aforementioned teaching. Reference is made to all comments made with respect to the aforementioned teaching, which are suitable for explaining the combination of agricultural vehicles as a whole.

BRIEF DESCRIPTION OF THE DRAWING

The invention is explained in the following in greater detail with reference to a drawing representing only one exemplary embodiment. In the drawing:

FIG. 1 shows a highly schematic representation of a combination of agricultural vehicles according to the invention comprising a driver assistance system according to the invention.

DETAILED DESCRIPTION OF THE EMBODIMENTS

The driver assistance system 1 according to the invention is utilized for controlling a combination of agricultural vehicles 2, which is claimed as such in an independent teaching.

The combination of vehicles 2 comprises a towing vehicle 3, which is designed as a tractor, and a mounted device 4. The mounted device 4 can be any type of mounted device 4 which can be coupled to a towing vehicle 3. In the exemplary embodiment represented, the mounted device 4 is a baler, with the aid of which haw, stray, or the like can be pressed into bales.

The driver assistance system 1 according to the invention is configured for generating control parameters 5a for the towing vehicle 3 and control parameters 5b for the mounted device 4.

The represented towing vehicle 3 comprises a machine controller 6, with the aid of which machine settings such as the engine speed of the towing vehicle engine 7, the rotational speed or the torque of the power take-off shaft 8 of the towing vehicle 3, the jack height 9 of a rear-end power lift, or the like, can be changed. The control parameters 5a generated by the driver assistance system 1 are fed to the machine controller 6. This feeding of the control parameters 5a can be carried out fully automatically or via the operator, for example, by way of the operator releasing the change in the control parameters 5a via the input/output unit 11 or entering the change in the control parameters 5a via the input/output unit 11.

In this case and preferably, the mounted device 4 is also equipped with a separate controller, namely a device controller 10 in this case, to which the control parameters 5b generated by the driver assistance system 1 are fed.

The driver assistance system 1 according to the invention is designed to be dialog-based. This means, the driver assistance system 1 comprises an input/output unit 11 for the above-defined dialog with the user.

The driver assistance system 1 according to the invention is designed as a rules-based control system and, therefore, comprises a rule interpreter 12 which generates the aforementioned control parameters 5a, 5b by executing the rules 13a of a set of rules 13.

The driver assistance system 1 according to the invention furthermore comprises a linking module 14 which receives at least two sets of rules 15-17 from different data sources 18-20, wherein the linking module 14 generates the set of rules 13 to be executed by the rule interpreter 12 from the received sets of rules 15-17 and the associated rules 15a-17a.

The essential benefits of the approach according to the invention were explained in the general part. In addition thereto, it is pointed out that the computing power and the amount of memory to be kept available locally in the towing vehicle 3 and in the mounted device 4 are comparatively small in the approach according to the invention. The reason therefore is that, due to the rules-based implementation of the driver assistance system 1, an execution of standardized rules by the rule interpreter 12 is provided, and so compute-intensive and memory-intensive special software can be dispensed with.

Moreover, it is pointed out that the way to ascertain which sets of rules are to be fed to the linking module 14 plays no role in the approach according to the invention. For example, a reading system known from the related art for recognizing the mounted device 4 can be utilized in order to receive the appropriate set of rules from the correct data source in a way to be explained further below.

In this case and preferably, it is provided that the linking module 14 receives a towing vehicle-specific set of rules 15 and a mounted device-specific set of rules 16 from the different data sources 18, 19 and generates the set of rules 13 to be executed from the received sets of rules 15, 16.

In the exemplary embodiment represented, a towing vehicle-specific set of rules 15 can be stored in the machine controller 6, wherein the linking module 14 is configured for receiving the towing vehicle-specific set of rules 15 from the machine controller 6 and linking the towing vehicle-specific set of rules 15 to one further set of rules 16. Alternatively or additionally, it can be provided that a mounted device-specific set of rules 16 is present in the device controller 10, as in the present case, wherein the linking module 14 is configured for receiving the mounted device-specific set of rules 16 from the device controller 10 and linking the mounted device-specific set of rules 16 to one further set of rules 15. This local storage of the sets of rules 15, 16 is advantageous in that the sets of rules 15, 16 basically stay with the component to which the sets of rules 15, 16 are directed.

In one alternative, a greater flexibility with respect to a possible change in the relevant set of rules 15, 16 can be implemented by way of the linking module 14 being configured for receiving a towing vehicle-specific set of rules 15 and/or a mounted device-specific set of rules 16 and/or, as in the present case, a combination of vehicles-specific set of rules 17 from a data source 20 remote from the combination of vehicles, namely a cloud-based data processing system in this case, and linking said set or sets of rules to one further set of rules 15, 16.

In the exemplary embodiment which is represented and, in this regard, is preferred, the linking module 14 receives the towing vehicle-specific set of rules 15 from the machine controller 6 and receives the mounted device-specific set of rules 16 from the device controller 10. In this case, the machine controller 6 is preferably fixedly situated on the towing vehicle 3, while the device controller 10 is preferably fixedly situated on the mounted device 4.

According to a mixed variant, however, the linking module 14 receives the towing vehicle-specific set of rules 15 from the machine controller 6 and receives the mounted device-specific set of rules 16 from a data source remote from the combination of vehicles.

It is apparent from the representation according to FIG. 1 that the rule interpreter 12 receives input parameters 22-24 from a data source 25-27, in this case and preferably from different data sources 25-27, wherein the rule interpreter 12 applies the rules 13a of the set of rules 13 to be executed to the received input parameters 25-27 in order to generate the aforementioned control parameters 5a, 5b.

In one particularly preferred embodiment, a data source 25 providing the input parameters 22 is a sensor system 28 which gathers the surroundings information for the combination of agricultural vehicles 2 with the aid of sensors. The sensor system 28 can comprise, for example, a straw moisture sensor, an air moisture sensor, an air temperature sensor, or the like. Optical sensors are to be mentioned, in this case, as further types of sensors which can be applied in this context, in particular image-processing sensors such as laser-based sensors or camera-based sensors.

Alternatively or additionally, a data source 26 providing the input parameters 23 is the input/output unit 11 of the driver assistance system 1. For example, it can be provided that the user manually enters certain surroundings parameters via the input/output unit 11.

Further alternatively or additionally, it can be provided that a data source 27 providing the input parameters 24 is a data source 20 remote from the combination of vehicles, in this case and preferably, for cutting area information or weather information. The cutting area information can be, for example, the topology of the cutting area to be worked with the aid of the combination of vehicles 2, which affects the control of the combination of vehicles 2.

With respect to the input parameters which can be entered, for example, via the input/output unit 11, it is also to be pointed out that the input parameters can also be optimization criteria which have been predefined by the user, wherein the rule interpreter 12 executes the rules 13a of the set of rules 13 to be executed with the objective of meeting the optimization criteria. Basically, the focus of the optimization can therefore be varied by way of the input parameters for the rule interpreter 12.

Of interest with respect to the approach according to the invention is the fact that not only can the sets of rules 15-17 and the input parameters 22-24 originate from entirely different data sources, but also that the rule interpreter 12, the linking module 14, and the input/output unit 11 can be implemented in nearly any way. In one first alternative, at least one of these components can run on a piece of control hardware which is fixedly installed on the towing vehicle or on the mounted device. Alternatively, it can be provided that at least one of these components runs on a piece of control hardware which is remote from the combination of vehicles, in particular, is remote from the towing vehicle and/or is remote from the mounted device.

Provided a data source remote from the combination of vehicles or a piece of control hardware remote from the combination of vehicles is under discussion in this case, the piece of control hardware is preferably, more generally, a piece of data processing hardware remote from the combination of vehicles, which, further preferably, can be a cloud-based data processing system, as indicated in FIG. 1. In principle, the data source remote from the combination of vehicles can also be a data server remote from the combination of vehicles 2, however, which communicates with the combination of vehicles via an Internet connection or the like.

The aforementioned data sources 18-20, 25-27 can therefore be implemented in various ways. As mentioned above, the data sources 18-20, 25-27 can be situated on the towing vehicle 3 or on the mounted device 4. It is also conceivable, however, that the data sources 18-20, 25-27 are assigned to one further agricultural working machine or to one further combination of agricultural vehicles 2. It is furthermore conceivable that the data sources 18-20, 25-27 are provided by a mobile terminal, in particular, by a smart device such as a smartphone. All this also relates, in principle, to the data processing hardware assigned to the rule interpreter 12, the linking module 14, and the input/output unit.

The links represented in FIG. 1 using dash-dotted lines are largely data links. All types of standardized links can be applied in this case, for example, ISOBUS, Bluetooth, UMTS, 3G, 4G, 5G, USB, CAN Bus, WiFi, Internet, Ethernet, or the like.

In this connection, it should be pointed out that the relevant link can also be encrypted using encryption methods, in principle, against unauthorized access.

There are numerous advantageous variants for the definition of the linkage specification 21. In the simplest case, according to the linkage specification 21, the rules of the sets of rules 15-17 received by the linking module 14 are aggregated, i.e., combined, with one another, unchanged. Alternatively, it can be provided that the received sets of rules 15-17 can be processed into new rules.

One important special case of the linking of the received sets of rules 15-17 is that, according to the linkage specification 21, different prioritizations can be assigned to rules 15a, 16a of two sets of rules 15, 16, which are competing with each other, wherein, thereafter, the competing rules 15a, 16a are executed by the rule interpreter 12 depending on the particular assigned prioritization. It can therefore be ensured that the set of rules of one component of the combination of vehicles 2 does not result in a malfunction of the other component of the set of vehicles 2.

According to one further teaching, which has independent significance, the combination of agricultural vehicles 2 comprising a towing vehicle 3 and a mounted device 4 are claimed as such. It is essential in this case that the combination of vehicles 2 is equipped with a driver assistance system 1 according to the invention. Reference is made to all the comments made in this regard.

LIST OF REFERENCE SIGNS

1 driver assistance system
2 combination of vehicles
3 towing vehicle
4 mounted device
5a control parameters for towing vehicle
5b control parameters for mounted device
6 machine controller
7 towing vehicle engine
8 power take-off shaft
9 jack height
10 device controller
11 input/output unit
12 rule interpreter
13 set of rules to be executed
14 linking module
15-17 sets of rules
18-20 data sources
21 linkage specification
22-24 input parameters
25-27 data sources
28 sensor system

What is claimed is:

1. A combination of vehicles including a towing vehicle designed as a tractor having a machine controller and a mounted device connected to the towing vehicle and having a device controller, and comprising a driver assistance system being configured for generating control parameters for the machine controller of the towing vehicle and/or for the device controller of the mounted device, wherein the driver assistance system comprises:

an input/output unit comprising data processing hardware configured for receiving input from a user and for output of information to the user, a rule interpreter comprising data processing hardware which generates the control parameters by executing rules that are a part of a set of rules, and a linking module comprising data processing hardware which receives at least two sets of rules from different data sources and generates, on the basis of the received at least two sets of rules and according to a linkage specification, a new set of rules to be executed by the rule interpreter, wherein the machine controller is configured to store a towing-specific set of rules that relates to optimized control of the tractor under various optimization criteria, wherein the device controller is configured to store a device-specific set of rules that relate to optimized operation of the mounted device, wherein the linking module is configured to receive the towing vehicle-specific set of rules that relate to optimized control of the tractor under various optimization criteria from the machine controller, and the mounted device-specific set of rules that relate to optimized operation of the mounted device from the device controller, and is configured to generate the new set of rules to be executed from the received sets of rules, and wherein different prioritizations are assigned to rules, which are competing with each other, of the two sets of rules according to the linkage specification, and the competing rules are executed by the rule interpreter depending on the assigned prioritization as the new set of rules, wherein the rule interpreter generates the control parameters based on the new set of rules, which are executed by the machine controller of the tractor and by the device controller of the mounted device, wherein the rule interpreter is configured to receive input parameters from the different data sources, apply the rules of the set of rules to be executed to the received input parameters, wherein a data source providing the input parameters is a sensor system which gathers surroundings information for the combination of vehicles with the aid of sensors, and/or a data source providing the input parameters is the input/output unit of the driver assistance system, and/or a data source providing the input parameters is a data source remote from the combination of vehicles, for cutting area information or weather information.

2. The combination of vehicles as claimed in claim 1, wherein the input parameters are optimization criteria predefined by the user and the rule interpreter is configured to execute the rules of the set of rules to be executed with an objective of meeting the optimization criteria.

3. The combination of vehicles as claimed in claim 1, wherein the rule interpreter and/or the linking module and/or the input/output unit run/runs on a piece of control hardware which is fixedly installed on the towing vehicle or on the mounted device, or the rule interpreter and/or the linking module and/or the input/output unit run/runs on a piece of control hardware remote from the combination of vehicles.

4. The combination of vehicles as claimed in claim 3, wherein a data source remote from the combination of vehicles and/or the control hardware remote from the combination of vehicles is a piece of data processing hardware remote from the combination of vehicles.

5. The combination of vehicles as claimed in claim 1, wherein according to the linkage specification, the rules of the sets of rules received by the linking module are aggregated with one another, unchanged, or are processed to form new rules.

\* \* \* \* \*